United States Patent Office 2,859,820
Patented Nov. 11, 1958

2,859,820
METHOD OF REDUCING WATER PRODUCTION IN OIL WELLS

Donald E. Trott, Dallas, Tex., assignor to California Research Corporation, San Francisco, Calif., a corporation of Delaware No Drawing. Application May 7, 1957
Serial No. 657,481

6 Claims. (Cl. 166—22)

This invention relates in general to the treatment of oil wells, and relates more particularly to the treatment of such wells to reduce the water production therefrom.

In many oil fields the oil-producing formation or formations are disposed adjacent to water-producing formations. Under such conditions, water from these formations enters the borehole and is produced therefrom along with the desired oil. This water production is undesirable, and particularly so in view of the fact that the amount of such water production tends to increase, with a consequent decrease in oil production, as the water encroaches into the oil-producing formation, until the production of oil from the well may not be economically attractive. This problem of water production along with oil production may be intensified when the well is treated by hydraulic fracturing, in which a suitable liquid is pumped into the well under increasing pressure to create fractures in the formation for increasing the production of fluid therefrom. Ideally, such fracturing would affect only the oil-producing formation, but when the water-producing zone or zones are located closely adjacent the oil-producing zone, or are inter-bedded therewith, such fracturing necessarily affects these water-producing zones. The effect of fracturing these water-producing zones is, of course, to increase the production of water therefrom, so that an increased water production results along with whatever increase in oil production is obtained.

The present invention contemplates a method for reducing the production of water from these water-producing zones and is particularly adapted, although not necessarily restricted, to use prior to hydraulic fracturing to prevent stimulation of water production by such fracturing. Broadly the present invention contemplates the injection into the well to be treated of a mixture comprising a water-insoluble, oil-soluble particulate plugging material in a non-hydrocarbon fluid carrier. In addition to the foregoing physical properties, the particulate material should be formed of a relatively non-sticky, or relatively hard or friable material to permit pumping of the material into the treated well. Various bituminous materials having these properties are available. Of these, air-blown asphalts which are readily soluble in the formation oil and sufficiently hard to be broken into particles of suitable size, are preferred. Such air-blown asphalts are described in U. S. Patent 2,223,027, Dawson et al., November 26, 1940, in which blown asphaltic bitumens are described as asphaltic bitumens which have undergone an oxidative treatment, i. e., have been exposed to the influence of air, oxygen, chlorine, permanganate and the like at elevated temperatures according to methods well known to those skilled in the art.

The mixture of particulate material and fluid carrier is preferably injected into the treated well at a high pressure and injection rate so that the plugging material will be squeezed firmly into the water-producing formation to plug the openings therein for reducing or stopping the water flow. The material will also necessarily be similarly squeezed into the oil-producing formation, but since the material is oil soluble, the material in the oil-producing formation will shortly dissolve and permit normal or increased oil production from the formation.

In the preferred form of the invention, the plugging material used is an air-blown asphalt material as set forth above, and the carrier fluid is salt water. Air-blown asphalt is used because, since it is oil soluble, it will not permanently damage the permeability of an oil-producing zone, but it is water insoluble, so that it is effective to plug the water-producing zones. Salt water is the preferred carrier fluid because it will not affect the air-blown asphalt mixed therein and because the salt water has a greater tendency to enter the water-producing zone than the oil-producing zone, owing to the difference in water permeabilities thereof.

In accordance with the preferred embodiment of the present invention, the mixture of air-blown asphalt and salt water is pumped into the treated well under increasing pressure until the asphalt material is displaced into the formation. If desired, the well may be treated prior to the use of the plugging mixture with an injection of a suitable fluid, such as salt water, under sufficient pressure to insure that the perforations to the treated formation are open. After this, the air-blown asphalt may be added to the injected salt water in a suitable concentration and the mixture pumped into the well under increasing pressure to force the asphalt particles into the formations. During this pumping, the concentration of the air-blown asphalt in the salt water may be maintained constant, or may be increased as the pumping continues. In the preferred form of practicing the invention, the first few barrels of the mixture are pumped into the well at a slow rate to give the mixture maximum opportunity to enter and plug the water-producing zones, and then injection rate and injection pressure are increased to a value great enough to cause fracturing of the water-producing zones, assuming these zones can be fractured, thus permitting a larger amount of the air-blown asphalt to penetrate into the water-producing formation than would be possible if fracturing did not occur. After the injection of the air-blown asphalt into the treated formation, the formation is preferably overflushed with a suitable fluid, such as lease crude oil, under a high pressure, to squeeze the plugging material firmly into the openings in the water-producing zones.

If the method of the present invention is to be used for water shut-off independently of hydraulic fracturing, the well may be produced in the normal manner after the above treatment, with the production of water therefrom substantially reduced by virtue of the plugging of the water-producing zones. If the treatment of the present invention is to be used prior to hydraulic fracturing, to prevent or reduce the stimulation of water production by the fracturing, the fracturing operation may be started upon completion of the present treatment and the well then produced in the normal manner. When the present method is used prior to such fracturing, the presence in the water-producing zones of the plugging material reduces the tendency of the fracturing fluid to enter the water-producing zones, so that the fracturing has more effect on the oil-producing zones than on the water-producing zones. Also, the plugging material remains in the water-producing zones after fracturing, whereas the plugging material in the oil-producing zone is softened and/or dissolved by the oil, thus resulting in an increase in the oil production relative to the water production.

An example of the effectiveness of the method of the present invention in producing water shut-off is illustrated in the below-described treatment of a representative well. This well, which had an oil-water contact at 4885 feet and which was perforated over the interval from 4867 feet to 4893 feet, had been producing an average of 13 barrels of oil per day and 21 barrels of water per day during the month prior to treatment. At the start of the treatment, salt water was pumped into the well under a pressure which increased to 1700 p. s. i. and then fell to 850 p. s. i., probably indicating a breakdown or fracture of the water-producing zones. This salt water injection was at the rate of 1¼ barrel per minute and was for the purposes of insuring that the perforations were clear for the subsequent injection of the plugging material and producing some breakdown of the water-producing sands to permit easier entry thereinto of the plugging material.

After this preliminary salt water injection, 100 pounds of air-blown asphalt was added to the salt water in the concentration of ¼ pound per gallon, and this mixture was pumped into the well at the rate of ¼ barrel per minute. After this, an additional 100 pounds of air-blown asphalt was added to the salt water in the concentration of ¾ pound per barrel and this mixture pumped in at the rate of ¼ barrel per minute. During this pumping, the surface injection pressure gradually increased, with several break-backs, to a maximum of 5200 p. s. i. After this treatment, the treated formation should be effectively plugged by the injected material which has been squeezed into the formation openings. As an additional refinement of the invention, the treated formation was overflushed with five barrels of salt water and three barrels of lease crude oil to soften and firmly displace the last of the plugging material into the formation. The treating pressure broke back rapidly to 1800 p. s. i. after injection of two barrels of the lease crude oil had entered the formation, indicating dissolution or displacement of the plugging material in the oil-producing zone.

For the purposes of the present invention, the water shut-off procedure was effectively completed and the well could have been produced in the normal manner, with a decrease in water production therefrom with respect to the oil production. In this particular case however, the water shut-off treatment was followed by hydraulic fracturing, in which 1500 pounds of propping sand was injected in 2150 gallons of heavy lease oil to hydraulically fracture the formation. During this fracturing, the fracturing fluid undoubtedly preferentially entered the oil-producing zone, in which the air-blown asphalt plugging material had been or was in the process of being dissolved, to produce greater permeability increase in this oil-producing zone than in the water-producing zone.

After this fracturing, the well flowed 99.5 barrels per day of oil and 66 barrels per day of water, after recovery of the oil used in the fracturing operation, with no apparent decline since the well production was limited by the top field allowable. Thus, the method of the present invention was very effective in reducing the stimulation of water-production by the fracturing operation, indicating that the method was effective to produce a substantial degree of water shut-off without permanently affecting the permeability or production from the oil-producing zone.

Although but a few embodiments of the present invention have been described, it will be obvious to those skilled in the art that various changes and modifications may be made therein without departing from the spirit of the invention or the scope of the appended claims.

I claim:

1. The method of reducing the flow of water into a well penetrating an earth formation having zones producing both oil and water which comprises the steps of introducing into said well a pumpable mixture of a water-insoluble, oil-soluble particulate material and a non-hydrocarbon soluble fluid carrier, pumping said mixture into contact with said formation under sufficient pressure to stop fluid flow from both said oil and water zones of said formation into said well, continuing said pumping of said mixture under pressure into said formation until said particulate material is displaced into said formation to seal off both said oil and water producing zones, then permitting oil in said oil producing zone to dissolve said particulate material from said oil producing zone, then injecting a hydraulic fracturing liquid into said well and increasing the pressure on said fracturing liquid to preferentially fracture said oil producing zone relative to said water producing zone.

2. The method of reducing the flow of water into a well penetrating an earth formation having zones producing both oil and water which comprises the steps of introducing into said well a pumpable mixture of a water-insoluble, oil-soluble particulate material and a non-hydrocarbon soluble fluid carrier, pumping said mixture into contact with said formation under sufficient pressure to stop fluid flow from both said oil and water zones of said formation into said well, continuing said pumping of said mixture under pressure into said formation until said particulate material is displaced into said formation to seal off both said oil and water producing zones, then injecting a hydraulic fracturing liquid including an oil-soluble hydrocarbon and a propping agent into said well to dissolve said particulate material in said oil producing zone and then increasing the pressure on said fracturing liquid to preferentially fracture said oil producing zone and inject said propping agent thereinto to increase production from said oil zone of said formation and reduce flow from said water zone.

3. The method in accordance with claim 1 in which said particulate material is air-blown asphalt.

4. The method in accordance with claim 1 in which said fluid carrier is salt water.

5. The method in accordance with claim 1 in which said particulate material is air-blown asphalt and said fluid carrier is salt water.

6. The method in accordance with claim 1 in which the concentration of said particulate material in said mixture is increased during said continued pumping.

References Cited in the file of this patent

UNITED STATES PATENTS

| 2,201,459 | Hulst | May 21, 1940 |
| 2,773,670 | Miller | Dec. 11, 1956 |